Aug. 30, 1932.  R. G. LE TOURNEAU  1,875,046

AUTOMATIC BRAKE

Filed Oct. 18, 1929

INVENTOR
R. G. Le Tourneau
BY Perry S. Webster
ATTORNEY

Patented Aug. 30, 1932

1,875,046

UNITED STATES PATENT OFFICE

ROBERT G. LE TOURNEAU, OF STOCKTON, CALIFORNIA

AUTOMATIC BRAKE

Application filed October 18, 1929. Serial No. 400,560.

This invention relates to brake mechanisms and especiallly to one to be used in connection with the cable drum of a hoist and similar machines.

In such a machine the cable drum is adapted to be placed in or out of driving engagement with the main drive shaft by means of a clutch, so as to then cause the cable to be wound onto the drum. It is usually desirable when the clutch is disengaged that the drum shall be held from rotation, and a brake is therefore arranged in connection with the drum to hold the same stationary.

Ordinarily such brake must be set and released by hand and the principal object of my invention is to provide a brake structure which will automatically engage and hold the drum against rotation as soon as the clutch is released, and yet will enable the drum to turn freely when connected in driving relation with the drive shaft.

A further object of the invention is to provide a single means for both manipulating the clutch and for enabling the brake to be released when desired and when the clutch is disengaged.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
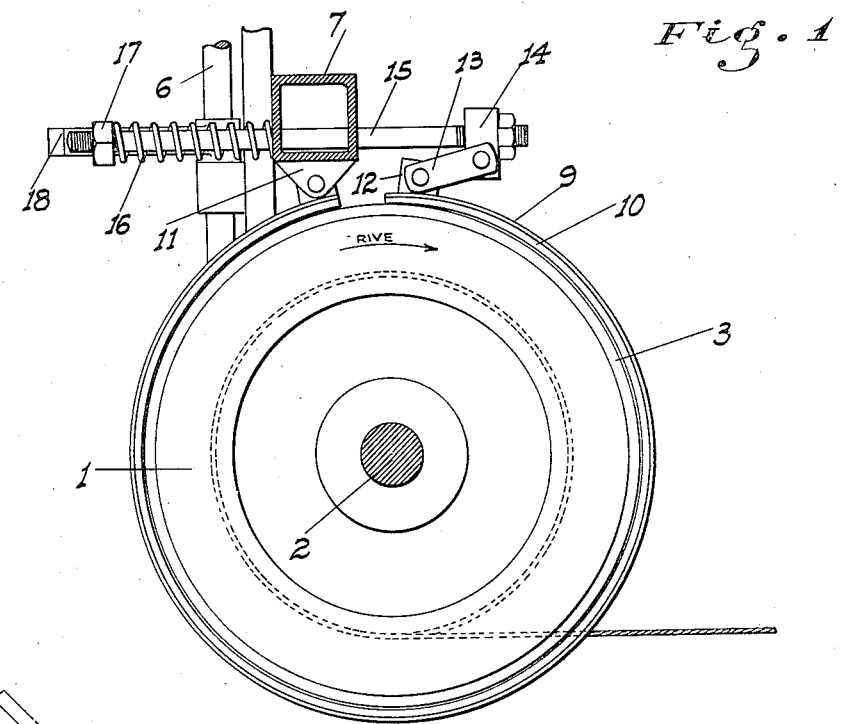
Fig. 1 is a side elevation of my improved automatic brake as mounted in connection with a cable drum.
Figure 2:
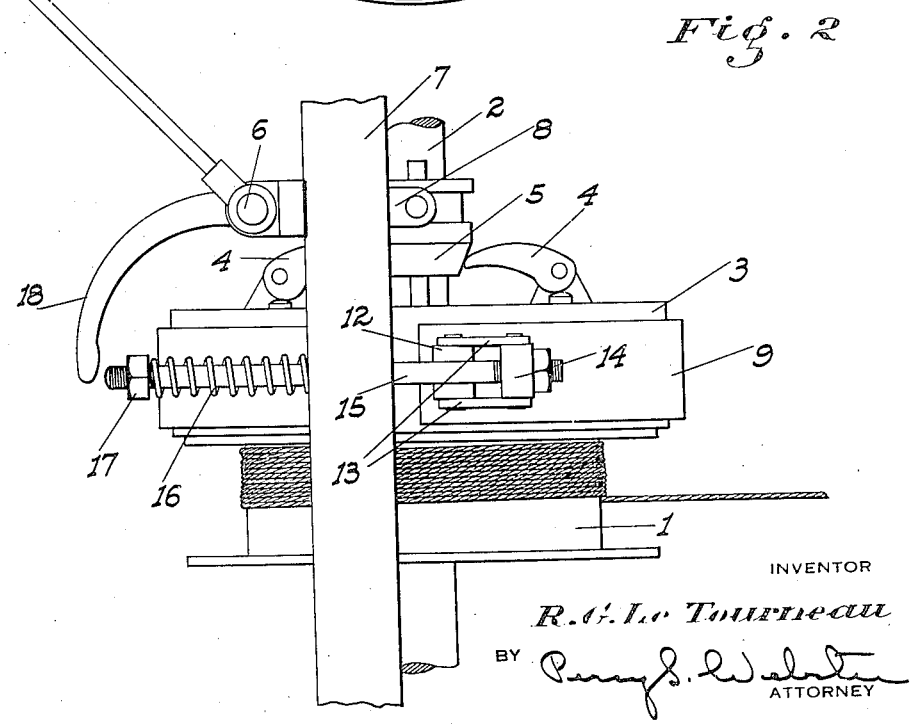
Fig. 2 is a top plan view of the drum, brake and clutch unit.

Referring now more particularly to the characters of reference on the drawing, the numeral 1 denotes a cable drum turnable on a drive shaft 2 and having a brake drum 3 fixed in connection with and to one side of the same. A friction clutch structure of common character is associated with the shaft and drum, the clutch elements being manipulated to cause the drum to be driven with the shaft by suitable means such as cam dogs 4 mounted in connection with the drum and engaged by the bevel face of a slide member 5 splined on the shaft. As stated, the clutch and its actuating means are of standard form and of themselves form no part of my invention.

The slide is moved along the shaft to cause the dogs to be moved to engage or disengage the clutch elements, by means of a vertical shaft 6 supported from a horizontal beam 7 extending over the brake drum parallel to the shaft, and having radial arms 8 engaging the slide.

The brake structure comprises a band 9 lined with suitable friction material 10 and passing about the drum 3. One end of the band 9 is anchored to the beam 7 by a suitable connection 11. The other end of the band has a lug 12 projecting outwardly therefrom to which one end of links 13 are pivoted. The links extend substantially tangent to the drum in the direction of movement of the upper periphery of the same when being driven (or away from the anchored end of the band) and are pivoted at their outer ends on a block 14. This block is adjustably secured on a rod 15 which is slidably supported by the beam 7 and projects through the same at right angles thereto, or at right angles to the plane of the shaft 2. The links are disposed relative to the rod so that a relatively small acute angle is included therebetween. Disposed about the rod on the side of the beam opposite to the links is a light compression spring 16, which bears at one end against the beam and at the other end against a nut 17 adjustable on the rod. This spring, as will be evident, acts to pull the rod in that direction such that the relatively free or link connected end of the brake band will be moved toward the anchored end of the same, or so that said band will be clamped against the drum. This movement of the rod also tends to cause the angle of the links with the rod to be increased, causing the band at that end to bind against the drum. This in turn causes any tendency of the drum to rotate in the direction of the above named movement of the rod 15 (which direction is opposite to that of the adjacent periphery of the drum when being driven), to move the band into tight clamping engagement with the drum at all points, positively preventing rotation of the same.

When the drum is driven however the action of the spring is overcome, the free end of the brake band is moved away from the anchored end of the same and the drum is then of course free to rotate. The brake action therefore is similar to what is had if a ratchet brake is used, but is noiseless, and the braking action is had all about the drum evenly and the strains are not concentrated at a relatively few points as is the case when ratchet pawls are used.

To manually release the brake when desired, at the same time that the clutch is disengaged, the clutch control 6 is provided with a laterally extending arm 18. This arm extends beyond the outer end of the rod 15 and is positioned, with the movement of the shaft 6, in a clutch disengaging direction, and after the clutch has been disengaged, to engage and push said rod 15 against the resistance of the spring 16. This moves the link connected end of the brakeband away from the drum and of course has the effect of releasing the brakeband from clamping engagement with the drum, and allowing the latter to turn free.

From the foregoing description it will be readily seen that I have produced such a device as substantially fulfills the objects of the invention as set forth herein.

While this construction sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An automatic brake including with a brake drum, a band about the drum, an anchor for one end of the band, links connected to the loose end of the band and extending substantially tangent to the drum away from the anchored end of the band, a rod connected to the outer ends of the links and extending in the direction of the anchored end of the drum at an acute angle to the links, a relatively fixed member slidably supporting the rod, and spring means acting on the rod to move the same lengthwise and in a direction to cause the link connected end of the band to be moved toward the anchored end.

2. A structure as in claim 1, with a manually actuable arm, one end of which is adapted to be engaged with the outer end of the rod to move the same lengthwise against the pressure of the spring so as to release the band.

In testimony whereof I affix my signature.
ROBERT G. LE TOURNEAU.